(12) United States Patent
Heikkilä

(10) Patent No.: US 8,405,344 B2
(45) Date of Patent: Mar. 26, 2013

(54) METHOD AND APPARATUS FOR ESTIMATING A ROTATION SPEED OF AN ELECTRIC MOTOR

(75) Inventor: Samuli Heikkilä, Helsinki (FI)

(73) Assignee: ABB Oy, Helsinki (FI)

( * ) Notice: Subject to any disclaimer, the term of this patent is extended or adjusted under 35 U.S.C. 154(b) by 403 days.

(21) Appl. No.: 12/617,339

(22) Filed: Nov. 12, 2009

(65) Prior Publication Data

US 2010/0134064 A1    Jun. 3, 2010

(30) Foreign Application Priority Data

Dec. 1, 2008  (EP) ..................................... 08170357

(51) Int. Cl.
*H02P 27/04* (2006.01)

(52) U.S. Cl. ............... 318/802; 318/400.02; 318/801; 318/803; 318/400.35; 290/44; 322/39

(58) Field of Classification Search ............... 318/802, 318/804, 801, 727, 400.02, 400.35
See application file for complete search history.

(56) References Cited

U.S. PATENT DOCUMENTS

| | | | | |
|---|---|---|---|---|
| 5,473,240 | A * | 12/1995 | Moreira ................. | 318/801 |
| 5,654,624 | A * | 8/1997 | Schroderus .............. | 322/39 |
| 6,014,006 | A * | 1/2000 | Stuntz et al. ............ | 318/804 |
| 6,137,258 | A * | 10/2000 | Jansen .................. | 318/802 |
| 6,745,083 | B2 | 6/2004 | Eckardt et al. | |
| 7,061,134 | B2 * | 6/2006 | Hiti et al. ............... | 290/44 |
| 8,008,878 | B2 * | 8/2011 | Gotz et al. .............. | 318/400.02 |
| 2002/0161492 | A1 | 10/2002 | Eckardt et al. | |
| 2007/0145939 | A1 | 6/2007 | Tajima et al. | |
| 2008/0265817 | A1 * | 10/2008 | Palma .................... | 318/400.35 |

FOREIGN PATENT DOCUMENTS

EP    1 793 486 A1    6/2007

OTHER PUBLICATIONS

Mohapatra et al. "A sensorless speed control using stator ripple currents for an induction motor drive with space phasor PWM" on pp. 81,ISSN : 0537-9989,Print ISBN: 0-86341-383-8,INSPEC Accession No. 8141135,Digital Object Identifier : 10.1049/cp:20040263 Date of Current Version : Nov. 1, 2004,Issue Date : Mar. 31-Apr. 2, 2004.*

Hiti et al. "Zero vector modulation method for voltage source inverter operating near zero output frequency", ISSN: 0197-2618, INSPEC Accession No. 8181096, 10.1109/IAS.2004.1348404, Nov. 1, 2004, Issue Date: Oct. 3-7, 2004. pp. 171-176.*

S. Ogasawara "A novel PWM scheme of voltage source inverters based on space vector theory" vol. 74, No. 1 (1990), 33-41, DOI: 10.1007/BF01573229.*

European Search Report for EP 08170357.1 completed May 11, 2009.

\* cited by examiner

*Primary Examiner* — Walter Benson
*Assistant Examiner* — Jorge Carrasquillo
(74) *Attorney, Agent, or Firm* — Buchanan Ingersoll & Rooney PC

(57) ABSTRACT

A method is disclosed for estimating a rotation speed of an electric motor supplied by an inverter, by determining a time derivative of a stator current vector of the electric motor during a zero vector state of the inverter; and determining an estimate of the rotation speed of the electric motor on the basis of the determined time derivative of the stator current vector.

24 Claims, 5 Drawing Sheets

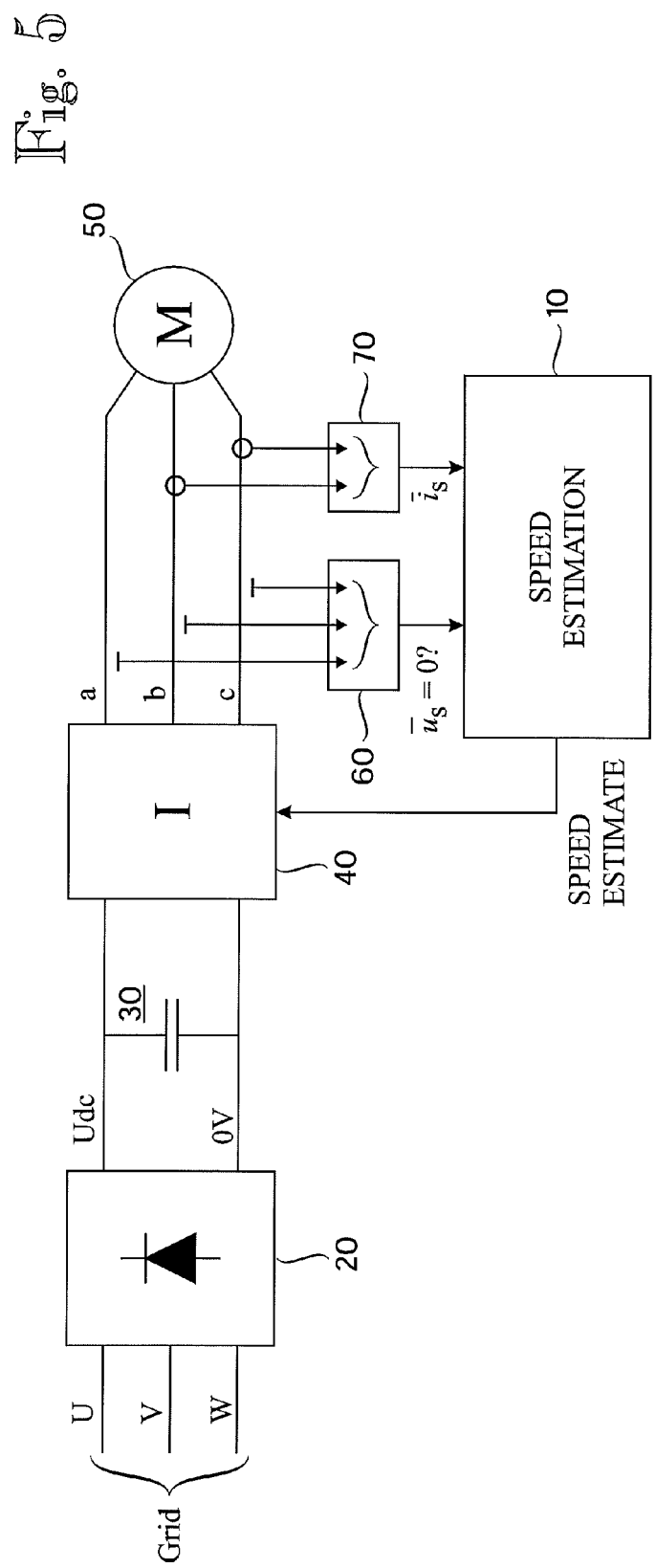

METHOD AND APPARATUS FOR ESTIMATING A ROTATION SPEED OF AN ELECTRIC MOTOR

FIELD OF THE INVENTION

The invention relates to estimation of a rotation speed of an electric motor, and particularly to estimation of a rotation speed of an electric motor supplied by an inverter.

BACKGROUND OF THE INVENTION

An inverter is an electric device, with which it is possible to supply a load with a voltage that has a variable frequency. Inverters are typically used in connection with frequency converters. FIG. 1 shows an example of a frequency converter connection. The frequency converter is typically composed of two converters, a rectifier 20 and an inverter 40, between which is provided a direct voltage ($U_{dc}$) or direct current intermediate circuit 30. The rectifier 20 and the inverter 40 may be located physically separately, and one rectifier may supply a plurality of inverters via a common intermediate circuit 30. An example of a rectifier 20 is a diode bridge, which obtains its supply from an alternating current source U, V, W, which is for instance a 50- or 60-Hz alternating current network (grid), and an example of an inverter 40 is an inverter bridge implemented by means of transistors (e.g. IGBT, Insulated-gate Bipolar Transistor) or other semiconductor switches. The inverter 40 is typically used to adjust the power transferred from the intermediate circuit 30 to a motor 50 or other similar load. Accordingly, as illustrated in the figure, the supply a, b, c from the output of the inverter 40 to the motor 50 is typically a three-phase alternating current connection with three phases a, b and c.

Inverters and, more generally, electric drives comprising inverters typically involve various safety functions which aim to control and ensure the safety of the drive in various operation conditions. As control methods have developed, electric drives without movement sensors have become more common in applications in which traditional solutions have required a feedback coupling, such as a tachometer, from the motor's shaft or from mechanics connected thereto. In this kind of sensorless applications, a possible fault situation of the inverter control system may lead to an overspeed of the motor and, as a result, to severe personal injury and/or considerable damage to property, e.g. in the case of lifts and cranes. Therefore, such sensorless solutions typically employ a separate safety circuit or safety supervision system, which is independent of the electric drive and which supervises or verifies the rotation speed or movement of the motor or mechanics connected thereto independently of the inverter by utilizing alternative speed determination. For example, if the determined alternative rotation speed value exceeds a predetermined threshold value, the safety circuit may activate a safety function, which typically comprises activation of an emergency braking of the drive. In addition or alternatively, the safety circuit may use both the alternative rotation speed value and the rotation speed value determined by the inverter for implementing various safety functions. For example, these two values could be compared to one another, and if they differ, certain safety functions might be activated.

A separate speed measurement adds to the cost of the safety function, however, and therefore some solutions are based on monitoring the voltage and current supplied to the motor by the inverter. The safety circuit thus uses the same signals as the inverter controlling the motor and calculates a signal proportional to the motor's speed. When this signal value exceeds a predetermined threshold value, the safety function is activated. The calculation of the signal proportional to the speed is preferably not dependent on motor parameters and it should substantially differ from the speed estimation algorithm used in the inverter in order that the safety circuit would be able to control the operation of the inverter. One solution is to calculate the signal proportional to the motor's speed simply on the basis of the fundamental wave frequency of the voltage or current vector, i.e. the supply frequency. In the case of a synchronous machine, the supply frequency corresponds directly to the speed of the machine. In the case of an asynchronous machine, there is a deviation corresponding to the slip frequency. This deviation, however, is considered negligible to the correct operation of the safety function in such solutions. An example of a solution utilizing the supply frequency of the machine for the estimation of the rotation speed is disclosed in U.S. Pat. No. 6,745,083.

Speed estimation solutions based on the monitoring of the frequency of the fundamental wave of the supply voltage or current have two problems. In the case of an asynchronous machine, such solutions are incapable of detecting a fault situation of the control of the frequency converter in which the actual speed of the machine has increased to a high value while the control erroneously assumes that the speed is close to zero and the frequency converter is supplying low-frequency voltage to the machine. In this situation the speed estimation based on the monitoring of the frequency of the fundamental wave of the supply voltage cannot detect that the speed of the machine is high, because it can only see the frequency supplied by the frequency converter to the machine. In reality, the operating point is on the wrong side of the breakover point and the speed increases in an uncontrollable manner because the accelerating torque caused by the load (e.g. in crane applications) is greater than the counter-torque produced by the machine. In the case of a synchronous machine, the stator current does not necessarily have a magnetization component and, therefore the current vector length is almost zero during zero moment and it is impossible to detect the fundamental wave on the basis thereof. At zero speed also the voltage vector length is zero and thus the voltage vector does not indicate anything about the speed either.

BRIEF DESCRIPTION OF THE INVENTION

The object of the invention is thus to provide a method and an apparatus for implementing the method so as to solve or at least alleviate the above problems. The object of the invention is achieved with a method, computer program product, and an apparatus that are characterized by what is stated in the independent claims. Preferred embodiments of the invention are described in the dependent claims.

The invention is based on monitoring the angular speed of the back-emf (electromotive force) of an electric motor for estimating a rotation speed of the electric motor. The idea of the invention is to determine a time derivative of a stator current vector of the electric motor during a zero vector state of an inverter supplying the electric motor, when the motion voltage is directly proportional to the determined time derivative, whereupon the estimate for the rotation speed of the electric motor can be determined on the basis of the thus determined time derivative of the stator current vector.

An advantage of the invention is that an estimate for the rotation speed of an electric motor can be determined in a reliable way also in case the frequency of the fundamental wave of the supply voltage or current cannot be reliably detected or otherwise used for the speed estimation. The invention can be used in connection of any application in which sensorless speed estimation is preferable either for principal or redundant speed determination purposes.

BRIEF DESCRIPTION OF THE FIGURES

In the following, the invention will be described in more detail in connection with preferred embodiments with reference to the accompanying drawings, in which

FIG. 5 illustrates a block diagram in accordance with an embodiment of the invention.

DETAILED DESCRIPTION OF THE INVENTION

Figure 1:
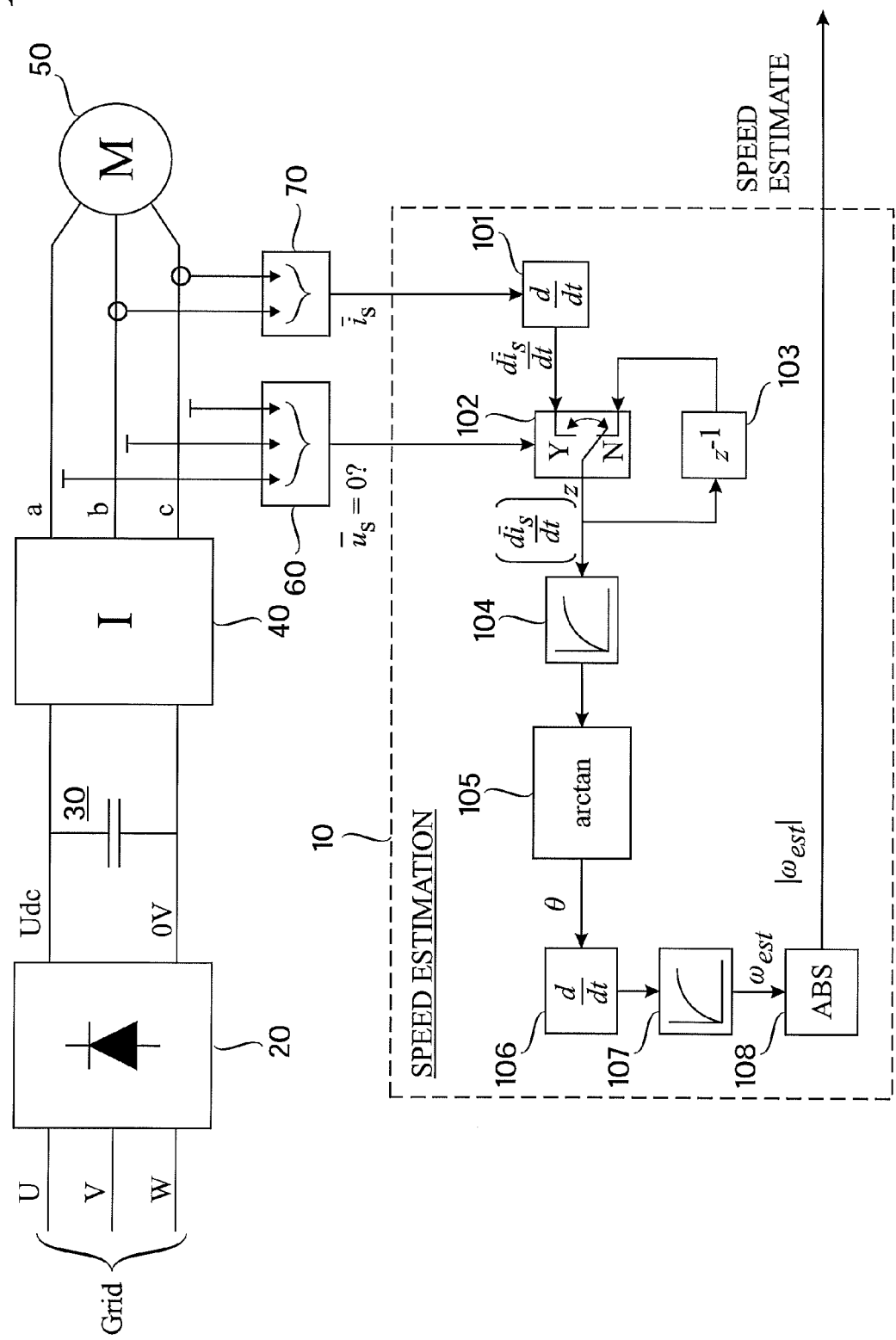
FIG. 1 illustrates a block diagram in accordance with an embodiment of the invention.

The example of a frequency converter connection shown in FIG. 1 was described above in the general part of the present description and will not be repeated here. It is to be noted that the use of the invention is not restricted to any given type of inverter 40. The term 'inverter' should be understood broadly to cover not only devices with basic inverter functionality but also devices which comprise suitable control logic for the control of the inverter. Such control logic of the inverter could be implemented within the inverter unit 40 or as a separate unit. Neither does the type of the supply U, V, W, 20, 30 of the inverter 40 or the type of the connections a, b, c between the inverter 40 and a motor 50, such as the voltage level thereof, have any significance to the basic idea of the invention. The electric motor 50 may be an asynchronous machine, such as an induction motor, or a synchronous machine, such as a separately excited synchronous motor, a permanent magnet synchronous motor, a reluctance motor or a linear motor, without that the invention is limited to these examples.

The invention is based on monitoring the angular speed of the back-emf (electromotive force) of an electric motor for estimating a rotation speed of the electric motor. When the behaviour of the back-emf is examined in the case of an asynchronous machine, the following equation applies in a stator coordinate system:

$$L_\sigma \frac{d\bar{i}_s}{dt} = \bar{u}_s - (R_s + R_R)\bar{i}_s + \left(\frac{1}{\tau_r} - j\omega_m\right)\bar{\psi}_R \quad (1)$$

wherein:
$\bar{u}_s$=stator voltage
$\bar{i}_s$=stator current
$\bar{\psi}_R$=rotor flux
$R_s$=stator resistance
$R_R$=rotor resistance
$L_\sigma$=leakage inductance
$\tau_r$=rotor time constant
$\omega_m$=mechanical speed $$\left(\frac{1}{\tau_r} - j\omega_m\right)\bar{\psi}_R = \text{back-emf}$$

$$j\omega_m\bar{\psi}_R = \text{motion voltage}$$

By assuming that the losses of the machine are small and the rotor time constant is great, the following approximate formula is obtained:

$$L_\sigma \frac{d\bar{i}_s}{dt} \approx \bar{u}_s - j\omega_m\bar{\psi}_R \quad (2)$$

Thus, the time derivative of the stator current changes in proportion to the difference of momentary voltage pulses $\bar{u}_s$ supplied into the machine and the motion voltage $j\omega_m\bar{\psi}^R$.

The motion voltage comprises information about the speed of the machine in two different ways. First of all, its amplitude in the short run is directly proportional to the speed of the machine (when the changes of the rotor flux are assumed to be slow). On the other hand, in a short-period observation the rotor flux tends to rotate along with the rotor if the speed of the machine overspeeds because of a malfunction of the control. The same turning of the phase angle may also be noticed in the motion voltage having the direction of a tangent of the rotor flux and thus the speed of the machine can be estimated directly from the angular speed of the motion voltage.

The motion voltage could be calculated on the basis of the derivative of the current and voltage pulses supplied into the machine according to equation 2. The inaccuracy of measurement of the derivative of the current might be a problem because the voltage pulses are narrow at a low speed. Another possible problem is the leakage inductance $L_\sigma$, which should be known with a sufficient accuracy such that the portion of the motion voltage from the derivative of the current could be calculated. These problems can be avoided by performing the measurement of the current when the voltage vector is zero. The frequency of use of zero vectors naturally depends on the modulation index of the inverter 40. However, at a low speed, when the probability of a malfunction of a sensorless control is highest, the zero vectors are well available because their duration is longer at low speeds. Thus, the stator current can be determined frequently enough during a zero vector state when the motion voltage is directly proportional to the determined derivative $(d\bar{i}_s/dt)z$:

$$j\omega_m\bar{\psi}_R \approx -L_\sigma\left(\frac{d\bar{i}_s}{dt}\right)_z \quad (3)$$

In addition, the coefficient $-L_\sigma$ may be ignored because the angular speed of the motion voltage follows the angular speed of the derivative of the current. The above is applicable not only in the case of an asynchronous machine but also in the case of a synchronous machine since the approximate formula of equation 3 is also valid for synchronous machines ($R_R=0$, $\tau_r=\infty$) In addition, in the case of synchronous machines, it is possible to estimate the speed on the basis of the derivative of the current even if the component of the fundamental wave is zero (cos $\phi=1$ & torque=0).

FIG. 1 further shows a block diagram of a speed estimation arrangement 10 in accordance with an embodiment of the invention. The speed estimation arrangement 10, or a corresponding functionality, may be a separate unit or device or integrated into the inverter 40 or the frequency converter 20, 30 and 40, for example. Sub-units 101 to 108 of the speed estimation arrangement 10 may all be located within a single unit or device, as shown in the figure, or within several separate units or devices. FIG. 1 further shows voltage and current measuring arrangements 60 and 70. They may be separate units or devices, as illustrated, or integrated into another unit, such as the speed estimation arrangement 10 or the inverter 40. The voltage measuring arrangement 60 detects a so-called zero vector state of the inverter 40 and forwards a signal indicative of said state to the speed estimation arrangement 10. The zero vector state of the inverter 40 generally refers to a state during which each output phase a, b and c of the inverter supplying the electric motor 50 is set to the same potential, i.e. the output voltage of each phase a, b and c is set to have the same level. In other words, during the zero vector state of the inverter 40 the stator voltage $\bar{u}_s$ of the electric motor 50 is zero. Thus, the zero vector state may be detected by monitoring the phase voltages a, b, c of the supply between the inverter and the motor. Alternatively, instead of detecting the zero vector state with the measuring arrangement 60, a signal indicative of the zero vector state of the inverter 40 could be produced by the inverter itself, for example. This, however, has no relevance to the basic idea of the invention. The current measuring arrangement 70 determines a stator current vector $\bar{i}_s$ of the electric motor 50. The stator current vector $\bar{i}_s$ may be determined in a manner known per se from any two of the phase currents of phases a, b and c, i.e. either phases a and b, a and c, or b and c. Alternatively, instead of using such a current measuring arrangement 70, other means could be used for determining the stator current vector $\bar{i}_s$ of the electric motor 50 without that it has any relevance to the basic idea of the invention.

The operation of the speed estimation arrangement according to various exemplary embodiments is given in the following with reference to FIG. 1. First, a time derivative of the stator current vector $\bar{i}_s$ of the electric motor 50 during a zero vector state of the inverter 40 is determined. This may be accomplished with units 101 and 102. The derivation unit 101 determines the time derivative of the stator current vector is and forwards it to the selection unit 102. The selection unit 102 then selects, in response to the signal indicative of the zero vector state of the inverter 40, the time derivative of the stator current vector supplied by the derivation unit 101 when the inverter 40 is in the zero vector state ($\bar{u}_s=0$? is Y) or a previous ($Z^{-1}$) value of the time derivative of the stator current vector supplied by the memory unit 103 when the inverter 40 is not in the zero vector state ($\bar{u}_s=0$? is N). The obtained result, i.e. the output of unit 102, may optionally be filtered, preferably low-pass filtered, with an optional filter unit 104 in order to reduce possible measuring noise. Next, a phase angle θ of the time derivative of the stator current vector $(d\bar{i}_s/dt)z$ is determined with an inverse tangent (arctan) function unit 105. By determining a time derivative of the phase angle θ with a derivation unit 106, an estimate $\omega_{est}$ of the rotation speed of the electric motor 50 is obtained. The time derivative of the phase angle produced by the derivation unit 106 may further be filtered with a filter unit 107 if necessary. Thus, the speed estimate $\omega_{est}$ may be a direct output of the derivation unit 106 or a filtered output thereof. The obtained speed estimate $\omega_{est}$ may be outputted from the speed estimation arrangement 10 as such or, alternatively, it is possible to determine an absolute value $|\omega_{est}|$ of the speed estimate with an absolute value (ABS) function unit 108 and output that from the speed estimation arrangement 10 as the speed estimate depending on the particular application in which the resulting speed estimate is used.

Due to the approximation of equation 2, in some cases the resistive losses ($=(R_s+R_R)\bar{i}_s$) of the machine may significantly deteriorate the accuracy of the speed estimate determined on the basis of equation 3. The accuracy of the speed estimate can be improved, however, if the parameters that are needed when taking into account the resistive losses are known. The most significant loss term in equation 1 is caused by the stator resistance since the terms $R_R\bar{i}_s$ and $\bar{\psi}_R/\tau^r$ partly compensate for each other. Thus, instead of equation 2, a more moderate approximation according to the following equation can be used:

$$L_\sigma \frac{d\bar{i}_s}{dt} \approx \bar{u}_s - R_s\bar{i}_s - j\omega_m\bar{\psi}_R \quad (4)$$

By assuming that during a zero vector state the stator current vector and the time derivative of the stator current vector are $\bar{i}_{s,Z}$ and $(d\bar{i}_s/dt)z$, respectively, it follows from equation 4 that during the zero vector state the motion voltage is:

$$j\omega_m\bar{\psi}_R \approx -L_\sigma \left(\frac{d\bar{i}_s}{dt}\right)_Z - R_s\bar{i}_{s,Z} \quad (5)$$

Thus, the motion voltage can be determined by determining the stator current vector during the zero vector state in addition to the time derivative of the stator current vector, and then determining the motion voltage on the basis of the stator current vector, the time derivative of the stator current vector, the stator resistance $R_s$, and the leakage inductance $L_\sigma$ according to equation 5. Naturally this embodiment requires that the stator resistance and the leakage inductance are known. The signs of the factors $R_s$ and $L_\sigma$ in equation 5 may be ignored because the angular speeds of the motion voltage vector $j\omega_m\bar{\psi}_R$ and its opposite vector $-j\omega_m\bar{\omega}_R$ are equal.

Figure 2:
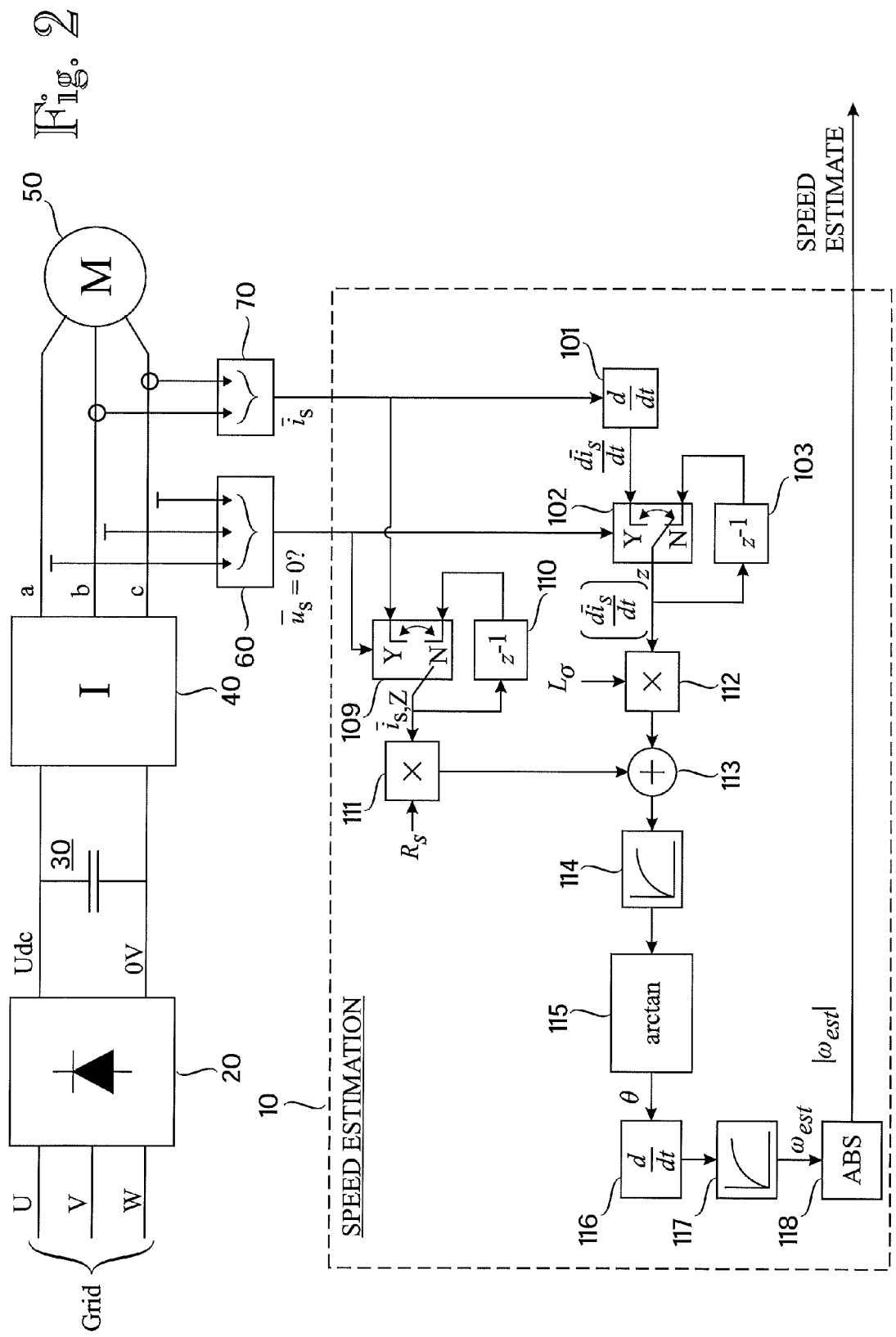
FIG. 2 illustrates a block diagram in accordance with an embodiment of the invention.

The operation of the speed estimation arrangement according to various exemplary embodiments utilizing equation 5 is given in the following with reference to FIG. 2. The time derivative of the stator current vector $\bar{i}_s$ of the electric motor 50 during a zero vector state of the inverter 40 may be determined with units 101, 102 and 103 in a similar manner as described in connection with the embodiment of FIG. 1. The stator current vector $\bar{i}_s$ of the during a zero vector state may be determined with units 109 and 110. The selection unit 109 selects, in response to the signal indicative of the zero vector state of the inverter 40, the stator current vector supplied by the measuring unit 70 when the inverter 40 is in the zero vector state ($\bar{u}_s=0$? is Y) or a previous ($Z^{-1}$) value of the time derivative of the stator current vector supplied by the memory unit 110 when the inverter 40 is not in the zero vector state ($\bar{u}_s=0$? is N). Next, a product of the determined stator current vector and a stator resistance of the electric motor is determined with a multiplier unit 111, and a product of the time derivative of the stator current vector and a leakage inductance of the electric motor is determined with a multiplier unit 112. The determined products are then summed in a summing unit 113. The obtained result, i.e. the output of unit 113, may optionally be filtered, preferably low-pass filtered, with an optional filter unit 114 in order to reduce possible measuring noise. Next, a phase angle θ of the sum of the products is determined with an inverse tangent (arctan) function unit 115. By determining a time derivative of the phase angle θ with a derivation unit 116, an estimate $\omega_{est}$ of the rotation speed of the electric motor 50 is obtained. The time derivative of the phase angle produced by the derivation unit 116 may further be filtered with an optional filter unit 117. Thus, the speed estimate $\omega_{est}$ may be a direct output of the derivation unit 106 or a filtered output thereof. The obtained speed estimate $\omega_{est}$ may be outputted from the speed estimation arrangement 10 as such or, alternatively, it is possible to determine an absolute value $|\omega_{est}|$ of the speed estimate with an absolute value (ABS) function unit 108 and output that from the speed estimation arrangement 10 as the speed estimate on the particular application in which the resulting speed estimate is used.

Figure 3:
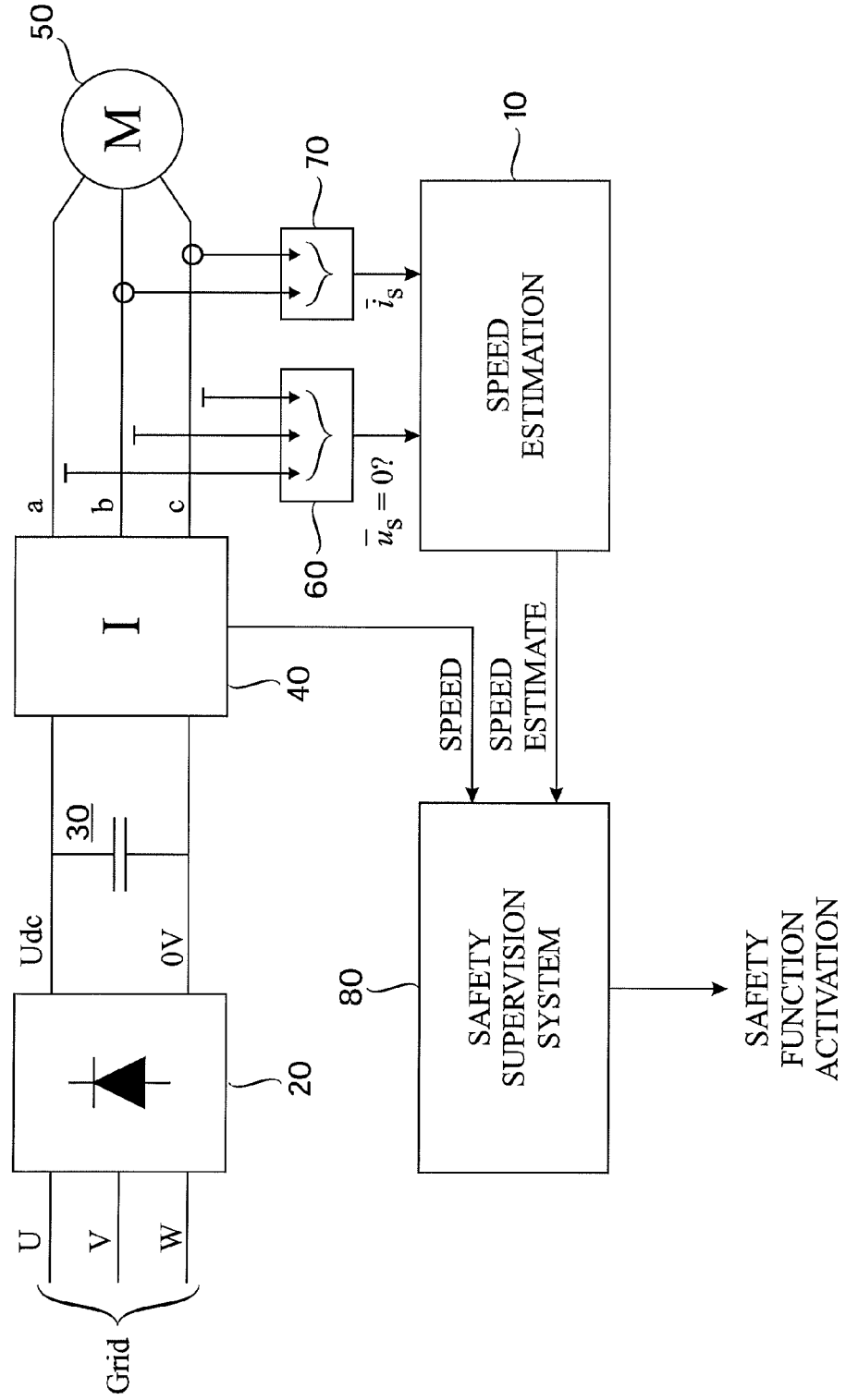
FIG. 3 illustrates a block diagram in accordance with an embodiment of the invention.

FIG. 3 illustrates a block diagram of an embodiment in which the speed estimation arrangement 10 is utilized in connection with a safety supervision system 80 or a similar unit or system providing the corresponding functionality. In the exemplary embodiment the speed estimate from the speed estimation arrangement 10 is delivered to the safety supervision system 80. In addition, at least one alternative speed estimate or value is delivered to the safety supervision system 80, in this case from the inverter 40. In this example it is assumed that the inverter 40 comprises a control unit or corresponding functionality which is able to provide such speed estimate. If the inverter 40 is controlled by a control unit or system external to the inverter 40, then the alternative speed estimate could be obtained from such an external control unit or system (not shown in the Figure), for example. Said at least one alternative speed estimate for the rotation speed of the electric motor (50) is preferably determined with an alternative determination method different from that used by the speed estimation arrangement 10. The speed estimate from the speed estimation arrangement 10 and said at least one alternative speed estimate can then be compared in the safety supervision system for the determination of the correctness of the available speed estimates. The safety supervision system 80 can activate a safety function, such as an emergency braking of the motor 50, on the basis of the comparison. The activation of the safety function may be initiated e.g. in case the comparison of the speed estimates indicates that the speed estimates differ from each other more than a predetermined threshold value, suggesting that there might be a malfunction in the control system of the motor.

Figure 4:
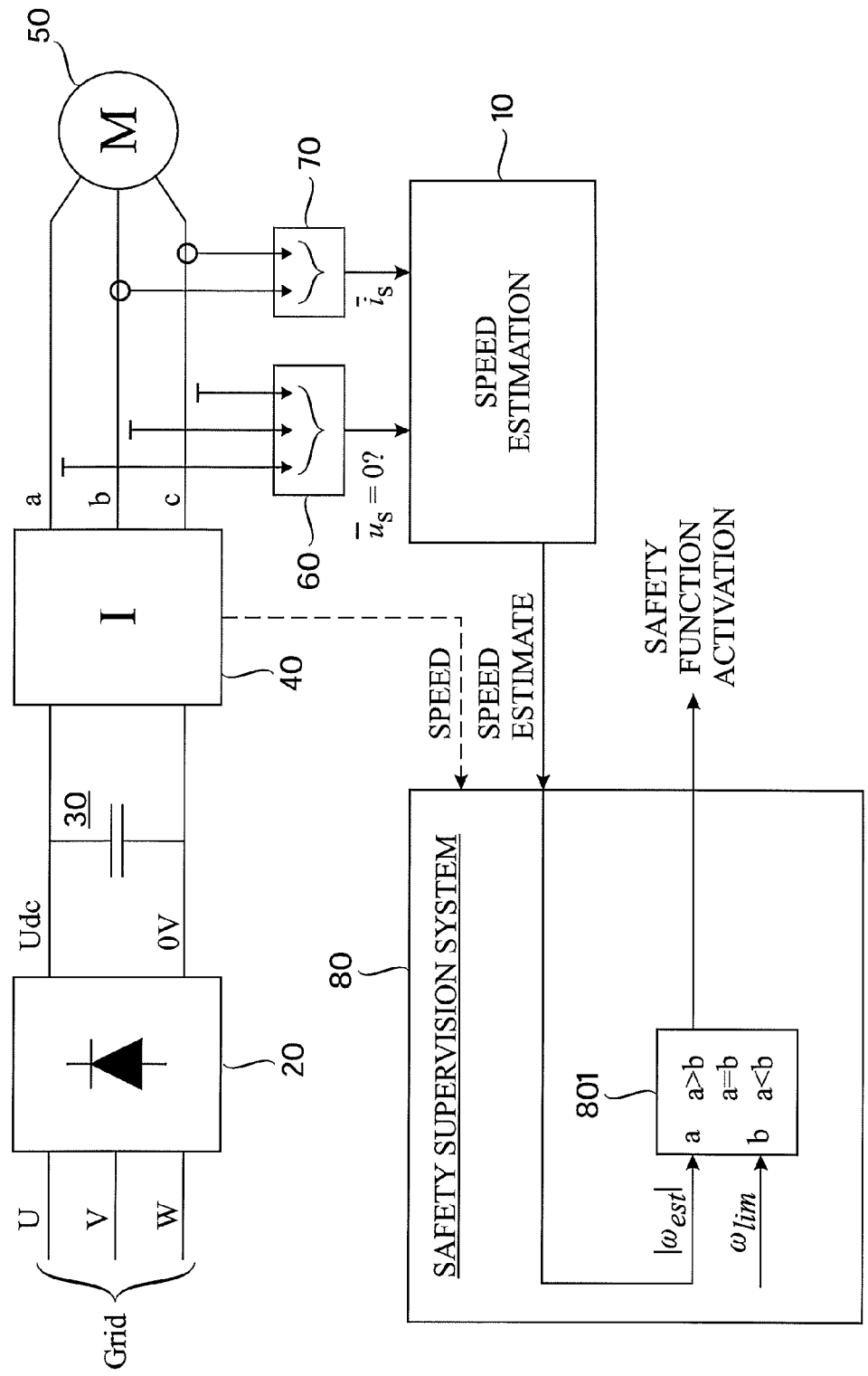
FIG. 4 illustrates a block diagram in accordance with an embodiment of the invention.

FIG. 4 illustrates a block diagram of another embodiment in which the speed estimation arrangement 10 is utilized in connection with a safety supervision system 80 or a similar unit or system providing the corresponding functionality. In the exemplary embodiment, the speed estimate from the speed estimation arrangement 10 is delivered to the safety supervision system 80. The speed estimate, preferably as an absolute value $|\omega_{est}|$, is compared to a predetermined threshold value $\omega_{lim}$ in a comparison unit 801. If the estimate of the rotation speed of the electric motor exceeds the predetermined threshold value, it indicates that the speed is too high and, consequently, a safety function, such as an emergency braking of the motor 50, may be activated. This embodiment of FIG. 4 can also be combined with the above embodiment of FIG. 3 as suggested by the broken line, showing that optionally the safety supervision system 80 may further receive and utilize the speed information from the inverter 40 or from another alternative source for implementation of various safety functions.

It should be noted that in the embodiments of FIGS. 3 and 4, the speed estimation arrangement 10 could be integrated into the safety supervision system 80 and, further, both of them could be integrated into the inverter 40 or the frequency converter 20, 30, 40. This, however, has no relevance to the basic idea of the invention.

The speed estimation arrangement or the functionality thereof could further be used for the control of the inverter 40 supplying the electric motor 50. In this case the speed estimate is conveyed from the speed estimation arrangement 10 to the inverter 40 as illustrated in FIG. 5. The inverter 40 can then use the speed estimate in a conventional manner either as primary speed estimate information or as supplementary (redundant) speed information. In this example it is assumed that the inverter block 40 comprises a control unit or corresponding functionality for controlling the inverter 40. If the inverter 40 is controlled by a separate control unit or system, then the speed estimate would be delivered to such an external control unit or system (not shown in the Figure). Thus, a sensorless control may be implemented with this embodiment. Also in this embodiment, the speed estimation arrangement 10 could be integrated into the inverter 40 or the frequency converter 20, 30, 40 or it may be a separate unit or device. Moreover, this embodiment could be combined with the above-described embodiments of FIGS. 3 and 4, for example.

An apparatus according to any one of the above embodiments, or a combination thereof, may be implemented as one unit or as two or more separate units that are configured to implement the functionality of the various embodiments. Here the term 'unit' generally refers to a physical or logical entity, such as a physical device or a part thereof or a software routine. One or more of these units may reside in an inverter or a frequency converter, for example.

An apparatus according to any one of the embodiments may be implemented at least partly by means of one or more computers or corresponding digital signal processing (DSP) equipment provided with suitable software, for example. Such a computer or digital signal processing equipment preferably comprises at least a working memory (RAM) providing storage space for arithmetical operations, and a central processing unit (CPU), such as a general-purpose digital signal processor. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the invention, or a part thereof, further preferably comprises suitable input means for receiving, for example, measurement and/or control data, which input means thus enable e.g. the monitoring of current and voltage quantities, and output means for outputting control data, for instance. It is also possible to use a specific integrated circuit or circuits, or discrete electric components and devices for implementing the functionality according to any one of the embodiments.

The invention according to any one of the embodiments, or any combination thereof, can be implemented in existing system elements, such as inverters or frequency converters, or control units thereof, or similar devices, or by using separate dedicated elements or devices in a centralized or distributed manner. Present devices for electrical drives, such as inverters and frequency converters or control units or systems thereof, typically comprise processors and memory that can be utilized in the functions according to the embodiments of the invention. Thus, all modifications and configurations required for implementing an embodiment of the invention, for instance, in existing devices may be performed as software routines, which may be implemented as added or updated software routines. If the functionality of the invention is implemented by software, such software can be provided as a computer program product comprising computer program code which, when run on a computer, causes the computer or a corresponding arrangement to perform the functionality according to the invention as described above. Such a computer program code may be stored or generally embodied on a computer readable medium, such as a suitable memory, e.g. a flash memory or a disc memory from which it is loadable to the unit or units executing the program code. In addition, such a computer program code implementing the invention may be loaded to the unit or units executing the computer program code via a suitable data network, for example, and it may replace or update a possibly existing program code.

It is obvious to a person skilled in the art that as technology advances, the basic idea of the invention can be implemented in a variety of ways. Consequently, the invention and its embodiments are not restricted to the above examples, but can vary within the scope of the claims.

The invention claimed is:

1. A method for estimating a rotation speed of an electric motor supplied by an inverter, the method comprising:
   determining a time derivative of a stator current vector of the electric motor during a zero vector state of the inverter; and
   determining an estimate of the rotation speed of the electric motor on the basis of the determined time derivative of the stator current vector.

2. The method of claim 1, wherein the determining of the estimate of the rotation speed of the electric motor comprises:
   determining a phase angle of the determined time derivative of the stator current vector; and
   determining a time derivative of the phase angle to obtain the estimate of the rotation speed of the electric motor.

3. The method of claim 2, wherein the time derivative of the stator current vector is filtered before the determination of the phase angle of the time derivative of the stator current vector.

4. The method of claim 2, wherein the time derivative of the phase angle is further filtered to obtain the estimate of the rotation speed of the electric motor.

5. The method of claim 1, wherein the determining of the estimate of the rotation speed of the electric motor comprises:
   determining a stator current vector of the electric motor during a zero vector state of the inverter;
   determining a product of the determined stator current vector and a stator resistance of the electric motor;
   determining a product of the determined time derivative of the stator current vector and a leakage inductance of the electric motor;
   determining a sum of the determined products;
   determining a phase angle of the sum; and
   determining a time derivative of the phase angle to obtain the estimate of the rotation speed of the electric motor.

6. The method of claim 5, wherein the sum of the determined products is filtered before the determination of the phase angle of the sum.

7. The method of claim 1, wherein during a zero vector state of the inverter each output phase of the inverter supplying the electric motor is set to a same potential.

8. The method of claim 1, comprising:
   comparing the estimate of the rotation speed of the electric motor to a predetermined threshold value; and
   activating a safety function of the electric motor if the estimate of the rotation speed of the electric motor exceeds the predetermined threshold value.

9. The method of claim 8, wherein comparing the determined estimate of the rotation speed of the electric motor to the predetermined threshold value is performed by using an absolute value of said estimate.

10. The method of claim 1, comprising:
    determining at least one alternative estimate for the rotation speed of the electric motor with an alternative determination method;
    comparing the estimate of the rotation speed of the electric motor to the at least one alternative estimate of the rotation speed of the electric motor; and
    activating a safety function of the electric motor on the basis of the comparison.

11. The method of claim 1, comprising:
    using the estimate of the rotation speed of the electric motor for control of the inverter supplying the electric motor.

12. A non-transitory computer-readable recording medium having a computer program recorded thereon that, when executed, causes a processor of a computer to carry out the steps of:
    determining a time derivative of a stator current vector of the electric motor during a zero vector state of the inverter; and
    determining an estimate of the rotation speed of the electric motor on the basis of the determined time derivative of the stator current vector.

13. An apparatus for estimating a rotation speed of an electric motor supplied by an inverter, the apparatus comprising:
    means for determining a time derivative of a stator current vector of the electric motor during a zero vector state of the inverter; and
    means for determining an estimate of the rotation speed of the electric motor on the basis of the determined time derivative of the stator current vector.

14. The apparatus of claim 13, wherein the means for determining the estimate of the rotation speed of the electric motor comprise:
    means for determining a phase angle of the determined time derivative of the stator current vector; and
    means for determining a time derivative of the phase angle to obtain the estimate of the rotation speed of the electric motor.

15. The apparatus of claim 14, wherein the means for determining the estimate of the rotation speed of the electric motor comprise:
    means for filtering the time derivative of the stator current vector before a determination of the phase angle of the time derivative of the stator current vector.

16. The apparatus as claimed in claim 14, wherein the means for determining the estimate of the rotation speed of the electric motor comprise:
    means for filtering the time derivative of the phase angle to obtain the estimate of the rotation speed of the electric motor.

17. The apparatus of claim 13, wherein the means for determining the estimate of the rotation speed of the electric motor comprise:
    means for determining a stator current vector of the electric motor during a zero vector state of the inverter;
    means for determining a product of the determined stator current vector and a stator resistance of the electric motor;
    means for determining a product of the determined time derivative of the stator current vector and a leakage inductance of the electric motor;
    means for determining a sum of the determined products;
    means for determining a phase angle of the sum; and
    means for determining a time derivative of the phase angle to obtain the estimate of the rotation speed of the electric motor.

18. The apparatus of claim 17, wherein the means for determining the estimate of the rotation speed of the electric motor comprise:
- means for filtering the sum of the determined products before a determination of the phase angle of the sum.

19. The apparatus of claim 13, wherein during a zero vector state of the inverter each output phase of the inverter supplying the electric motor is set to the same potential.

20. The apparatus of claim 13, comprising:
- means for comparing the estimate of the rotation speed of the electric motor to a predetermined threshold value; and
- means for activating a safety function of the electric motor if the estimate of the rotation speed of the electric motor exceeds the predetermined threshold value.

21. The apparatus of claim 20, comprising:
- means for determining an absolute value of the estimate of the rotation speed of the electric motor, wherein the means for comparing the estimate of the rotation speed of the electric motor to the predetermined threshold value are configured to use the absolute value of said estimate for the comparison.

22. The apparatus of claim 13, comprising:
- means for determining at least one alternative estimate for the rotation speed of the electric motor with an alternative determination method;
- means for comparing the estimate of the rotation speed of the electric motor to the at least one alternative estimate of the rotation speed of the electric motor; and
- means for activating a safety function of the electric motor on the basis of the comparison.

23. The apparatus of claim 13, wherein the inverter supplying the electric motor is configured to use the estimate of the rotation speed of the electric motor for control of the supply of the electric motor.

24. An apparatus for estimating a rotation speed of an electric motor supplied by an inverter, the apparatus being configured to:
- determine a time derivative of a stator current vector of the electric motor during a zero vector state of the inverter; and
- determine an estimate of the rotation speed of the electric motor on the basis of the determined time derivative of the stator current vector.

* * * * *